Feb. 11, 1969  J. E. HIERS ET AL  3,426,603
WATER CONDITIONING SYSTEM
Filed April 20, 1966  Sheet 6 of 8

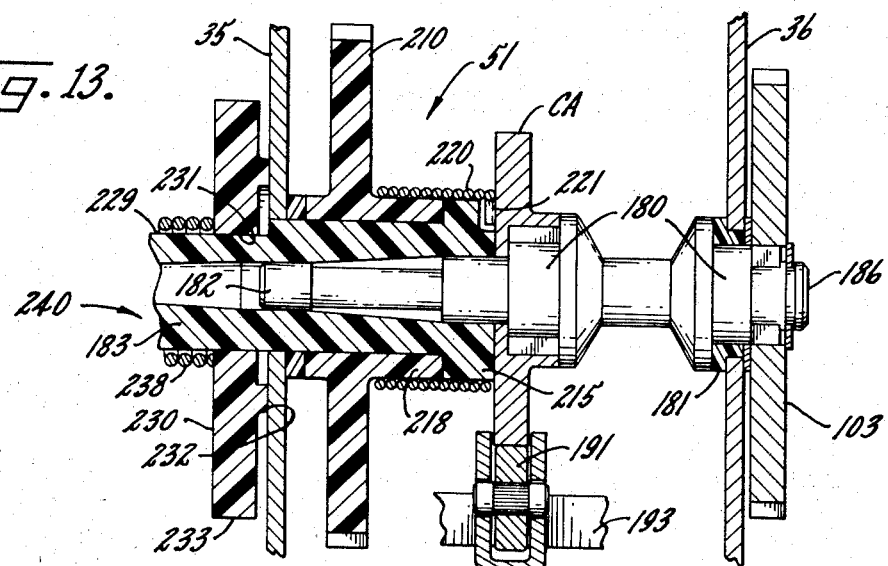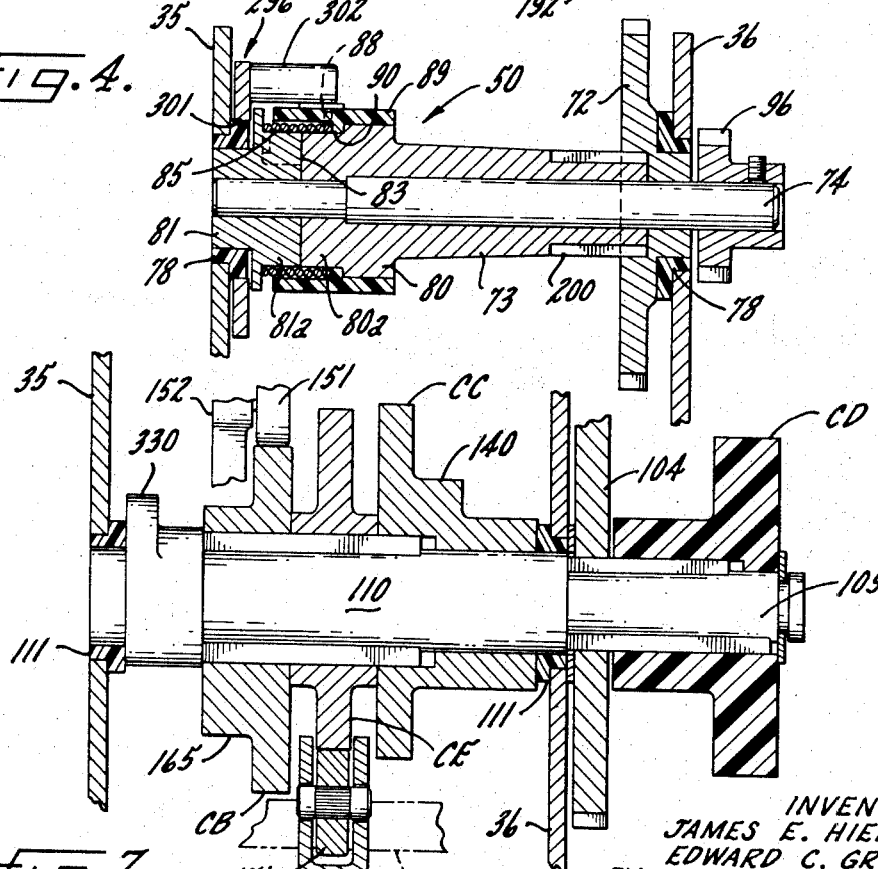

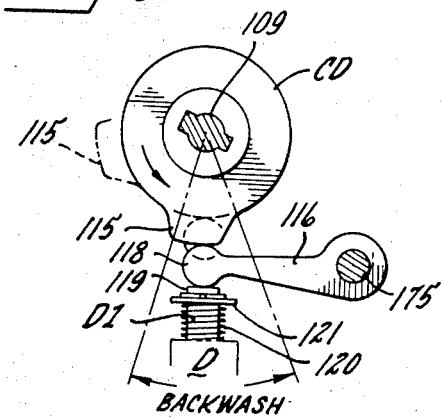
Fig. 8.
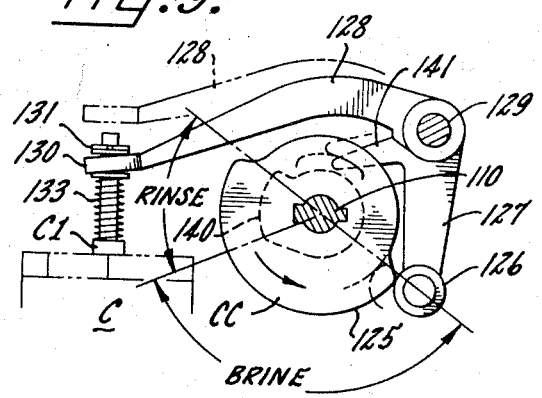
Fig. 9.
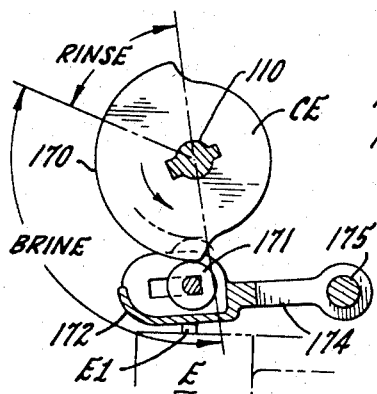
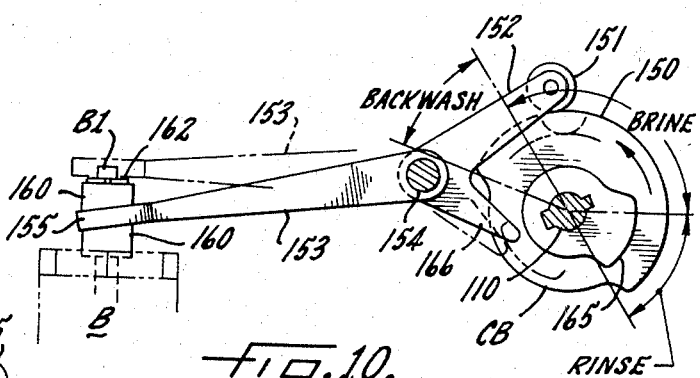
Fig. 10.
Fig. 11.
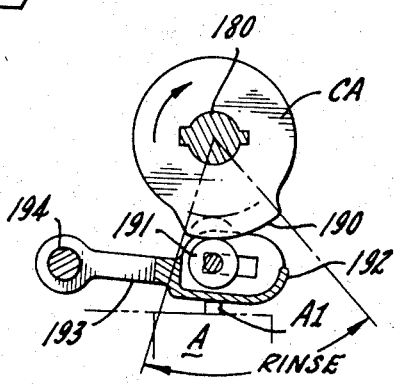
Fig. 12.

INVENTORS.
JAMES E. HIERS
EDWARD C. GROUT
BY
Hume, Groen, Clement & Hume
ATTORNEYS.

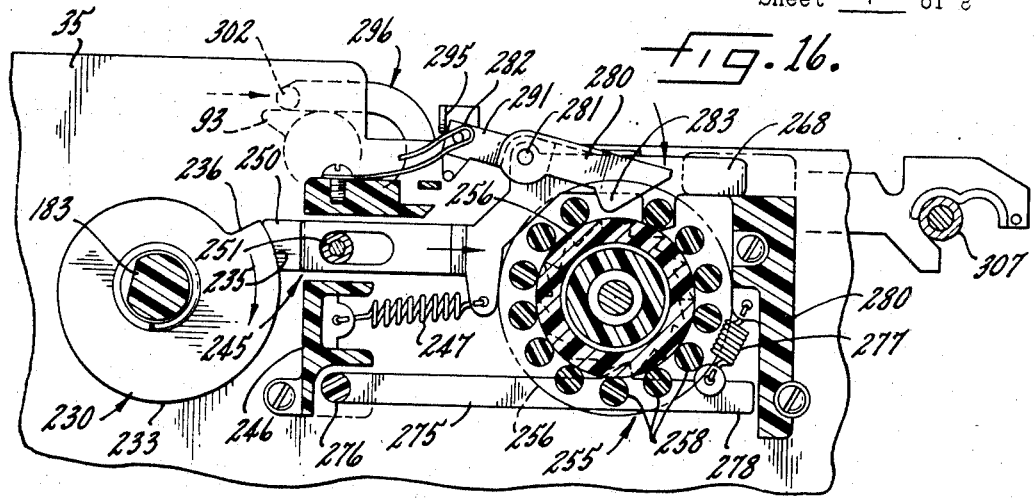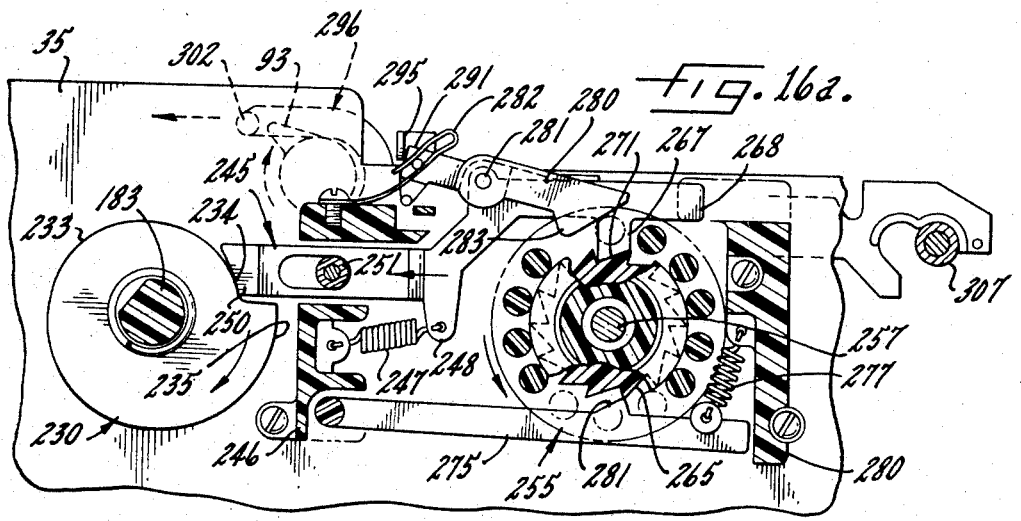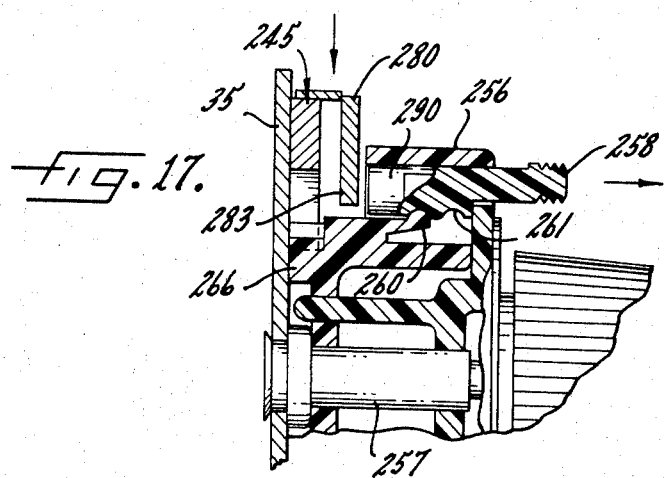

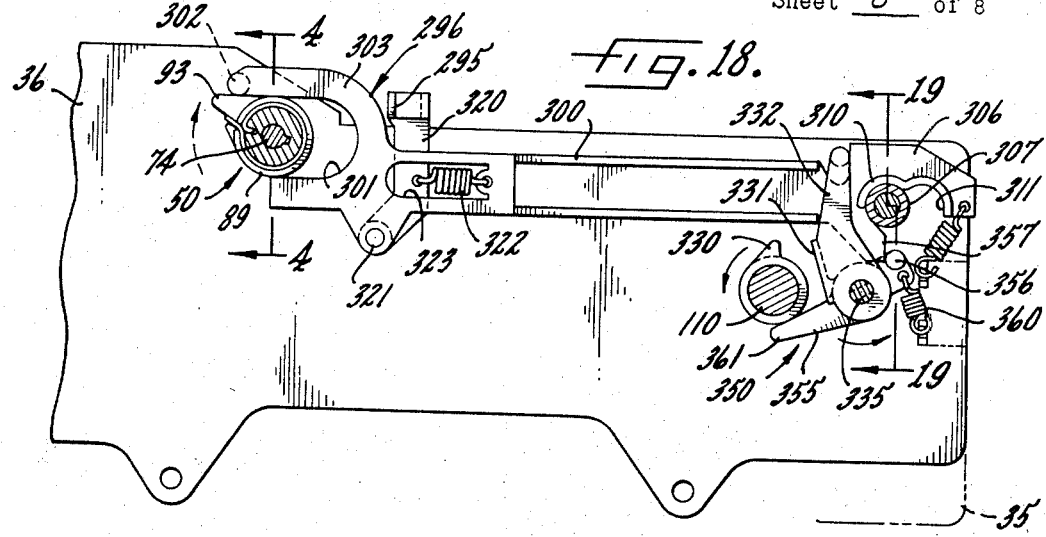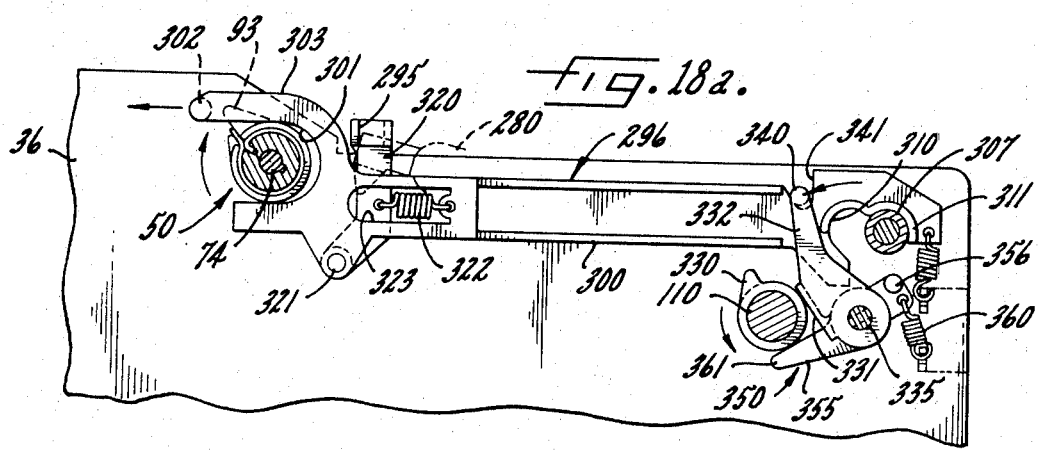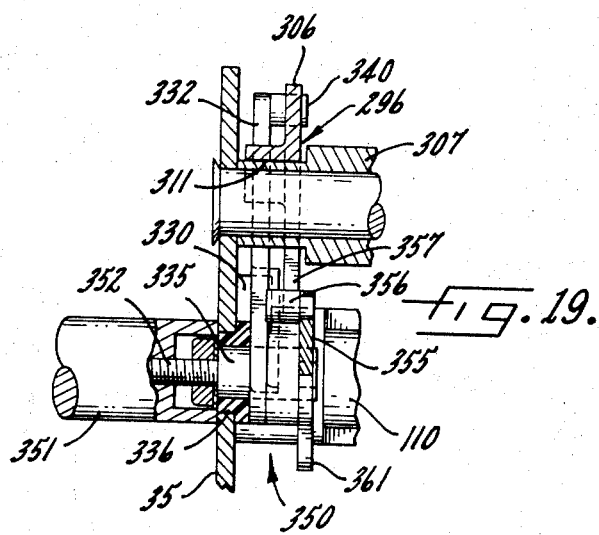

United States Patent Office 3,426,603
Patented Feb. 11, 1969

3,426,603
WATER CONDITIONING SYSTEM
James E. Hiers, Mahtomedi, and Edward C. Grout, White Bear Lake, Minn., assignors, by mesne assignments, to Union Tank Company, Chicago, Ill., a corporation of Delaware
Filed Apr. 20, 1966, Ser. No. 543,824
U.S. Cl. 74—3.5
Int. Cl. F16h 3/74; D06f 33/02
15 Claims

ABSTRACT OF THE DISCLOSURE

A pair of drive trains driven from a constant speed output shaft for operating a water conditioning system. The first of said drive trains includes a clutch which normally disengages an operator. The second of said drive trains includes a timer selectively effective to release the clutch and engage the operator.

---

This invention relates to a timing device. It deals more particularly with a timing device for a water conditioning system.

It is an object of the invention to provide a new and improved timing device.

It is another object to provide a new and improved timing device for controlling service and regeneration in a water conditioning system.

It is still another object to provide a timing device which utilizes a constant speed electric motor as both a timing element and a prime mover for mechanically operating the timing device.

It is yet another object to provide a timing device wherein the electric motor which serves as a timing element and a prime mover is in continuous operation.

It is a further object to provide a timing device wherein a continuously operating motor serves as a timing element and a prime mover, and new and improved clutch means between the motor and responsive means is effective to control manipulation of the responsive means.

It is yet a further object to provide a timing device of the aforedescribed character for controlling service and regeneration in a five cycle water conditioning system, wherein the cycles comprise service softening, and regeneration, backwash, brining, slow rinse, and fast rinse.

It is still a further object to provide a timing device which facilitates manually initiating regeneration at any time at the discretion of the user, for example.

The foregoing and other objects are realized in accord with the present invention by providing a timing device wherein an electric motor drives two gear trains, one connected to actuator means for operating a plurality of control valves, and the other connected to a time and day set assembly for presetting the day and time for, and then signaling, actual time for regeneration. A spring clutch assembly in the actuator gear train normally prevents operation of the control valve until a predetermined time and day preset by the user into the time and day set assembly is reached. A second spring clutch assembly in the gear train assembly to the time and day set assembly facilitates setting the time and day for regeneration without positively disconnecting the gear trains from the electric motor. Control of the first spring clutch assembly is the basis for operation of the timing device, and it can be effected either through the time and day set assembly, or manually by the user if regeneration is desired at a time other than that preset.

The invention, both as to its organization and method of operation, taken with further objects and advantages thereof, will best be understood by reference to the following description taken in connection with the accompanying drawings, in which:

FIGURE 4 is a sectional view taken through the timing device, illustrating a spring clutch assembly embodying features of the present invention;

FIGURE 7 is a sectional view taken through the timing device illustrating certain of the operating cams for the valves A–E;

FIGURE 8 is an enlarged view of the cam for operating the backwash valve D;

FIGURE 9 is an enlarged view of the cam arrangement for operating the check valve B;

FIGURE 10 is an enlarged view of the cam arrangement for operating the transfer valve C;

FIGURE 11 is an enlarged view of the cam for operating the drain valve E;

FIGURE 12 is an enlarged view of the cam for operating the rinse valve A;

FIGURE 13 is a sectional view taken through the timing device illustrating another operating cam and spring clutch assembly embodying features of the present invention;

FIGURE 16 is a view similar to FIGURE 12, showing the time and day set assembly of the timing device as it prepares to initiate regeneration;

FIGURE 16a is a view similar to FIGURE 16 illustrating the time and day set assembly of the timing device at a later point in time when regeneration has been initiated;

FIGURE 17 is an enlarged sectional view similar to FIGURE 15 illustrating the day set sub-assembly in its "actuation relationship";

FIGURE 18 is a view taken along lines 18—18 of FIGURE 3, with parts broken away;

FIGURE 18a is a view similar to FIGURE 18, illustrating the immobilizer assembly in another position; and FIGURE 19 is a further enlarged sectional view taken through the immobilizer assembly of the timing device.

Figure 1:
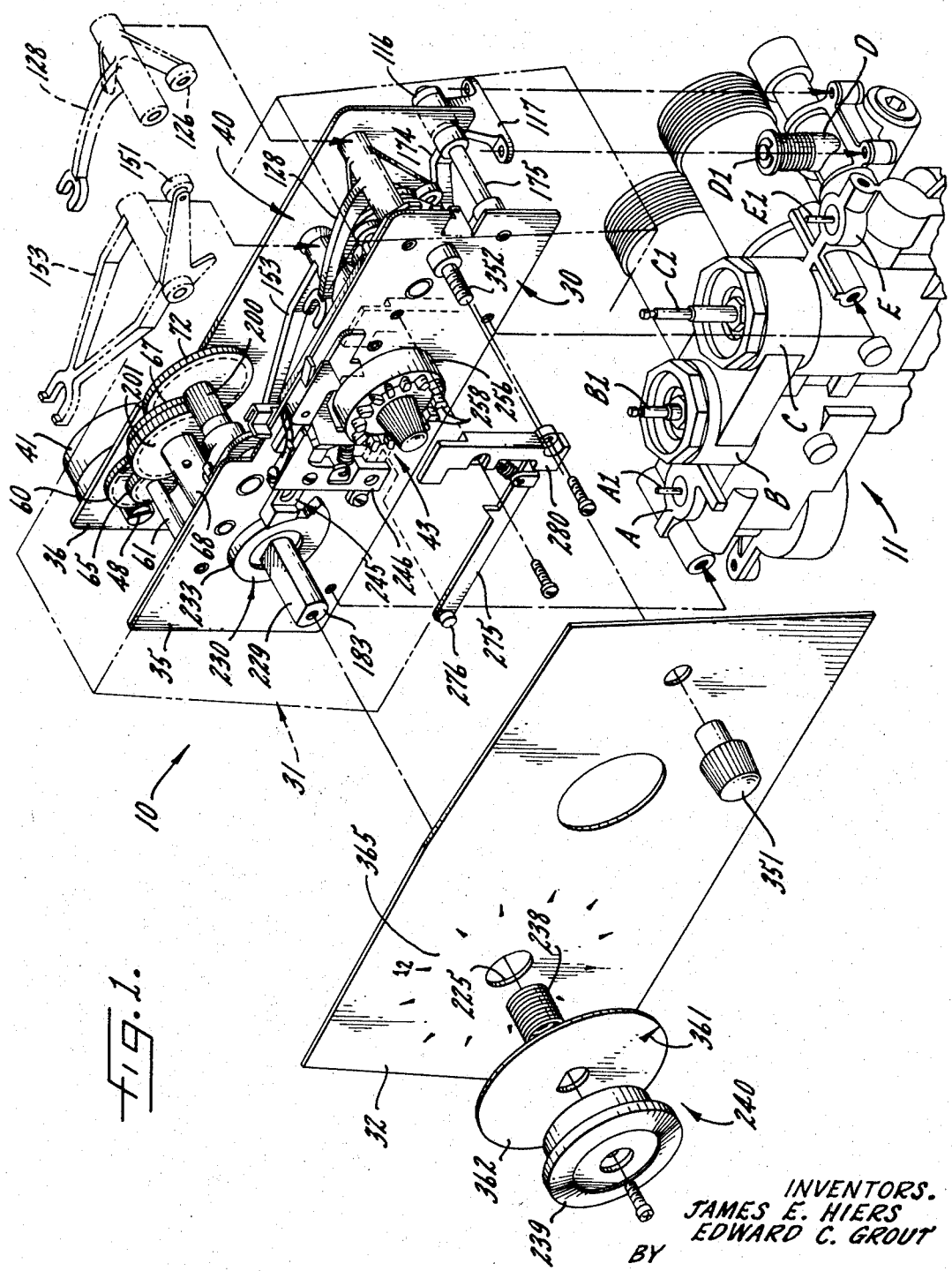
FIGURE 1 is an exploded front perspective view of the timing device embodying features of the present invention, in association with a control valve arrangement for a water conditioning system.

Referring now to the drawings, and particularly to FIGURE 1, a timing device embodying features of the present invention, is illustrated generally at 10, in association with a valve arrangement 11 for controlling water treatment operations in a water conditioning system. The valve arrangement 11 which is illustrated and described in detail in the co-pending application of Hiers et al., Ser. No. 518,146, filed Jan. 3, 1966, entitled "Valve," and assigned to the same assignee as the present invention, controls a five cycle water treatment program, including service water flow, and regeneration backwash, brining, slow rinse, and fast rinse.

The timing device 10 manipulates the valve arrangement 11 according to a preset schedule to effect the water treatment program. The timing device 10 opens and closes five valves A–E in E in the valve arrangement 11 according to the aforementioned preset schedule. These valves A–E have corresponding valve actuator stems A1–E1 extending into operative engagement with the timing device 10, which cyclically manipulates the stems to effect the opening and closing of respective valves and cycle a prescribed service and regeneration sequence.

The water conditioning system in question normally operates in its service softening cycle. At a selected time(s) on any given day(s) in the week, the timing device 10 automatically manipulates the valve arrangement 11 to initiate regeneration in the system. The first stage of regeneration is "backwash" flow of service water through the tank (not shown). After a backwash cycle of predetermined length, controlled by the timing device 10, the device initiates "brining," or the flow of brine through hte treatment tank to regenerate the conventional salt bed therein.

The brining cycle is followed by a "slow rinse" cycle which actually is effected during the same time period as the brining cycle, insofar as the timing device 10 is concerned. In effect, the valve arrangement 11 directs brine through the water conditioning tank for a first portion of a predetermined time period until the supply of brine is exhausted in the brine tank (not shown) and then rinse water alone passes through the water conditioning tank for the remainder of the predetermined period of time.

After the slow rinse cycle is completed, the timing device 10 manipulates the valve arrangement 11 to initiate the "fast rinse" cycle of regeneration. In this cycle, raw water is passed at a relatively high rate through the treatment bed for a predetermined period of time, at the end of which the timing device 10 automatically manipulates the valve arrangement 11 to terminate the regeneration process and reinitiate service softening.

The timing device 10 is constructed according to the present invention so that it can automatically initiate and control regeneration twice during each twenty-four hour day; once during each twelve hour period. In addition, the exact day of the week when regeneration is to be accomplished can be simply and expeditiously preset. Should regeneration be desirable at any time on any day other than that preset, it can be initiated manually through the timing device 10.

In normal operation of the water conditioning system incorporating a timing device 10 and valve arrangement 11, regeneration is usually accomplished once on any given day or days of the week. For twenty-three hours on the selected day, normal service softening takes place. Then at 2:00 a.m., on a selected day, for example, regeneration is initiated by the timing device 10. The timing device is preferably set so that regeneration is normally accomplished at such an hour to avoid shutting off soft water during the day.

The regeneration period is one hour in the present device. It includes a twenty-minute backwash cycle, a thirty minute combined brining and slow rinse cycle, and a final ten-minute fast rinse cycle, after which normal service softening is initiated once again.

Turning to details of the timing device 10, it comprises a chassis 30 seated on the valve arrangement 11, enclosed by a plastic housing 31 having a fact plate 32. The chassis 30 includes a front plate 35 and a back plate 36. The plates 35 and 36 are generally rectangular in configuration, and are joined by cam and gear shafts of the actuator assembly 40 for the valves A–E.

Figure 2:
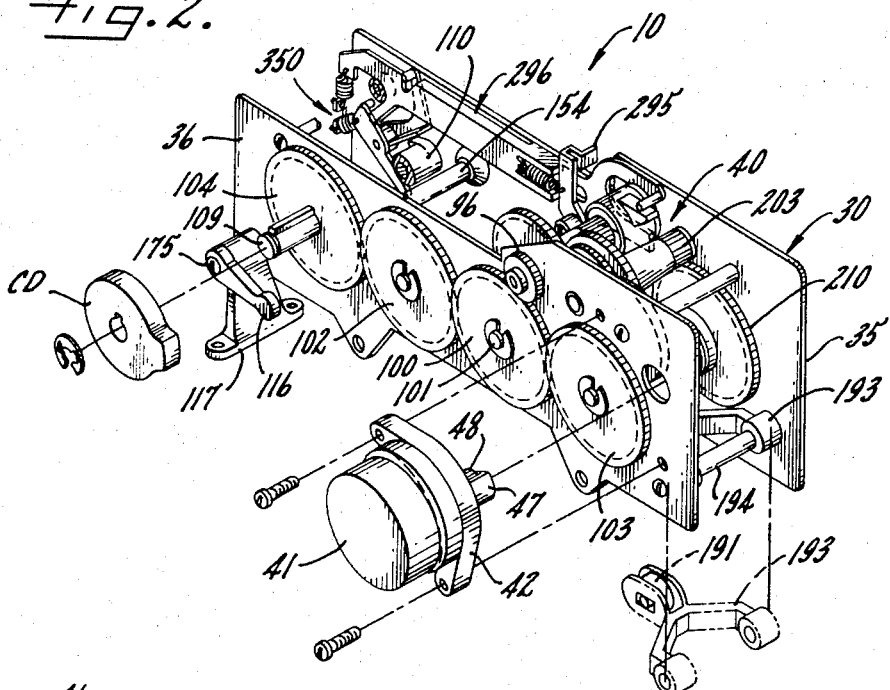
FIGURE 2 is an exploded back perspective view of the timing device.

A conventional electric motor 41 is mounted on an arcuate plastic fitting 42 secured to one end of the chassis back plate 36 (see FIGURES 1–3) and the motor is effective to drive the actuator assembly 40 and manipulate the valves A–E according to the preset schedule. Manual adjustment of the time and day set assembly 43 on the front chassis plate 35, through suitable means at the face plate 32 of the housing 31, establishes a selected relationship in the time and day set assembly to preset the desired time and day for regeneration.

The motor 41 is a sixty-cycle synchronous electric motor which turns its output shaft 46 at a constant speed of one r.p.m. In this sense, the motor 41 acts as both a timing element to time the service softening and regeneration cycles, and as a prime mover for driving the actuator assembly 40 in manipulating the valves A–E.

The output shaft 46 of the motor 41 is partially enclosed by an extension 47 of the plastic fitting 42, and both extend through an aperture in the back chassis plate 36. The shaft 46 has a pinion gear 48 on its free end. The pinion gear meshes with and drives first and second gear trains 49a and 49b which, as part of the actuator assembly 40, in turn (a) drive five cams CA, CB, CC, CD, and CE to actually manipulate the valves A, B, C, D, and E; and (b) the time and day set assembly 43 to signal initiation of regeneration.

According to the present invention, the first gear train 49a, which connects the motor 40 to the actuator cams A–E, includes a spring clutch assembly 50. The time and day set assembly 43 manipulates the clutch assembly 50 at a preset time to cause the motor 40 to drive the cams CA–CE, and thus initiate regeneration at a predetermined time on a given day.

The second gear train 49b continuously drives the time and day set assembly 43 in performing its function of initiating regeneration at a prescribed time on a given day of the week. This second gear train 49b, in turn, includes a spring clutch assembly 51 which permits coordinating the time and day set assembly with "sun time" without positively disconnecting it from the motor 40.

Turning now to the details of the timing device 10, and more particularly to the first gear train 49a connecting the output shaft 46 of the motor 40 with the cams CA–CE, the pinion gear 48 on the shaft 46 meshes with a disc gear 60 mounted for rotation of a fixed shaft 61 extending between and secured to the front and back chassis plates 35, 36. The plastic housing 47 encloses that portion of the pinion gear 48 which is not open to and in mesh with the disc gear 60.

Immediately adjacent to and connected to the disc gear 60 for rotation on the shaft 61 is a smaller disc gear 65. The disc gear 65 meshes with a larger disc gear 67 mounted for rotation on an adjoining parallel shaft 68 extending between the front and back chassis plates 35, 36.

Affixed to one side of the disc gear 67 for rotation on the shaft 68 is another smaller gear 71. In addition to the disc gear 67 and 71 being rotatable on the shaft 68, the shaft 68 itself is journaled in the front and back chassis plates 35, 36, as will hereinafter be discussed in detail in the description in the gear train 49b.

The small disc gear 71 meshes with another large disc gear 72 (see FIGURE 4) fixed to a sleeve shaft 73. The disc gear 72 and sleeve shaft 73 are rotatable on a pin shaft 74. The clutch assembly 50 hereinbefore referred to interconnects the sleeve shaft 73 and pin shaft 74 adjacent the front chassis plate 35, and the entire assembly of sleeve shaft 73, pin shaft 74, and clutch assembly 50, is journaled for rotation in plastic ring bearings 78 seated in suitably formed apertures in the front and back chassis plates 35, 36.

Still referring to FIGURE 4, the clutch assembly 50 includes an annular collar 80 formed on one end of the sleeve shaft 73, and adjoining annular collar 81 affixed to the same end of the pin shaft 74. The collars 80 and 81 have co-extensive, cylindrical barrel sections 80a, respectively, abutting each other and slidable on their interface 83, relative to each other. These barrel sections 80a and 81a are encircled by a helical coil spring 85 which is coiled in a clockwise direction (when looking at the clutch assembly 50 from the front plate 35).

The free inner end 88 of the coil spring 85 is bent upwardly and receive in a suitably formed anchoring aperture in a plastic sleeve 89 encircling the coil spring and the annular collar 80a formed on the sleeve shaft 73. The sleeve 89 is freely rotatable on the collar 80a of the sleeve shaft 73, guided in rotation relative thereto by an annular internal rib 90 formed within the sleeve.

Figure 3:
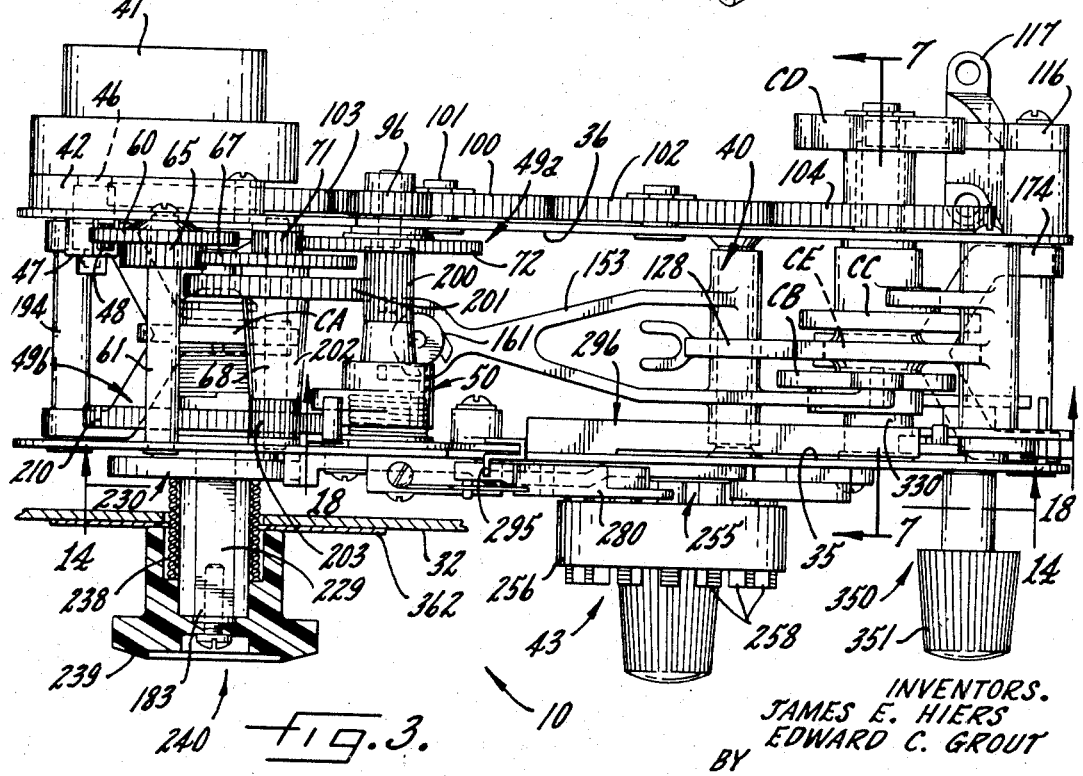
FIGURE 3 is a plan view of the timing device.
Figure 14:
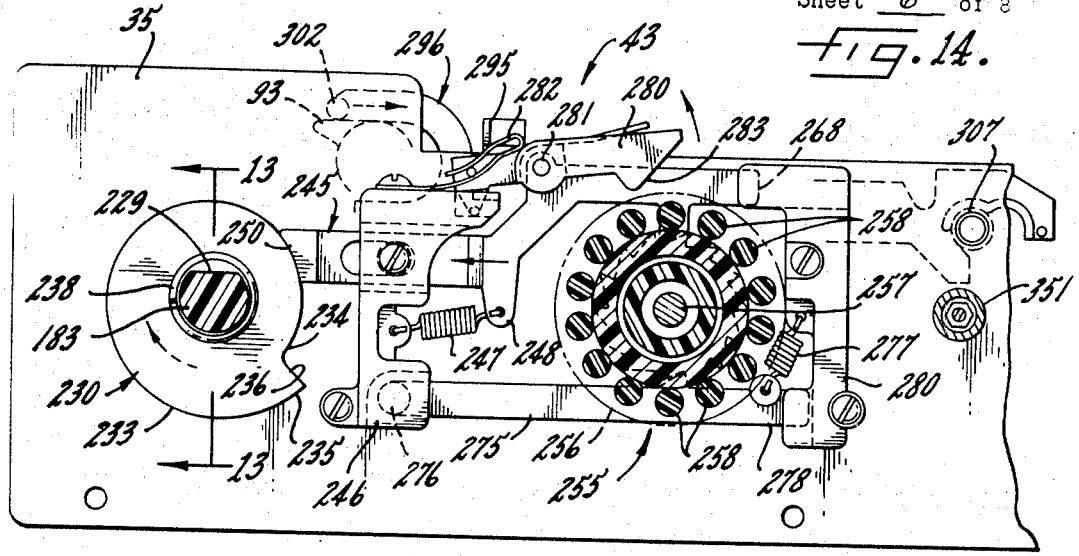
FIGURE 14 is a view taken along line 14—14 of FIGURE 3, with parts broken away, illustrating the disposition of the time and day set assembly of the device during normal service softening.

As seen in FIGURES 3, 14, and 16, for example, an immobilizer cam 93 is formed unitarily with and extends radially outwardly from the sleeve 89. In normal service softening operation of the water conditioning system, this cam 93 is positively immobilized by the time and day set assembly 43. Accordingly, rotation of the sleeve shaft 73 by the gear train 49a from the motor 40 is not transmitted to the pin shaft 74, and the pin shaft remains immobile. This is because the coil spring of the clutch assembly is not permitted to tighten or "wind up" on the adjoining collar sections 80a and 81a, respectively as long as the cam arm 93 is restrained by the time and day set assembly 43.

When the time and day set assembly 43 calls for regeneration, in a manner hereinafter discussed in detail, the assembly releases the cam 93, permitting the sleeve 89 to rotate and the constantly rotating sleeve shaft 73 to tighten the coil spring 85 on the collar sections 80a and 81a, so as to drive the pin shaft 74 with the rotating sleeve shaft 73.

Fixed to the rearmost free end of the pin shaft 74, behind the chassis back plate 36, is a pinion gear 96. The pinion gear 96 is in mesh with a transfer gear 100 which is journaled for rotation on a stub shaft 101 suitably mounted on the back chassis plate 36. The gear ratios of the various gears in the aforedescribed gear train 49a between the motor 46 and the transfer gear 100 are such that the transfer gear 100 rotates at a constant speed of one revolution every two hours, while it is being rotated.

The transfer gear 100 is, in turn, in mesh with three other transfer gears 102, 103, and 104; aligned across the back chassis plate 36. These transfer gears 102–104 are identical in construction to the transfer gear 100 and, accordingly, also rotate at a constant one-half revolution per hour, when driven by the transfer gear 100.

It is the transfer gears 103 and 104 which directly drive the cams CA–CE to control the valve arrangement 11 in its service and regeneration cycles. The transfer gear 103 directly drives the cam CA which controls the valve A, the "rinse valve." The transfer gear 104, on the other hand, directly drives the cams CA–CE which control the valves B–E, respectively, the "transfer" valve, the "check" valve, the "backwash" valve, and the "drain" valve.

Figure 5:
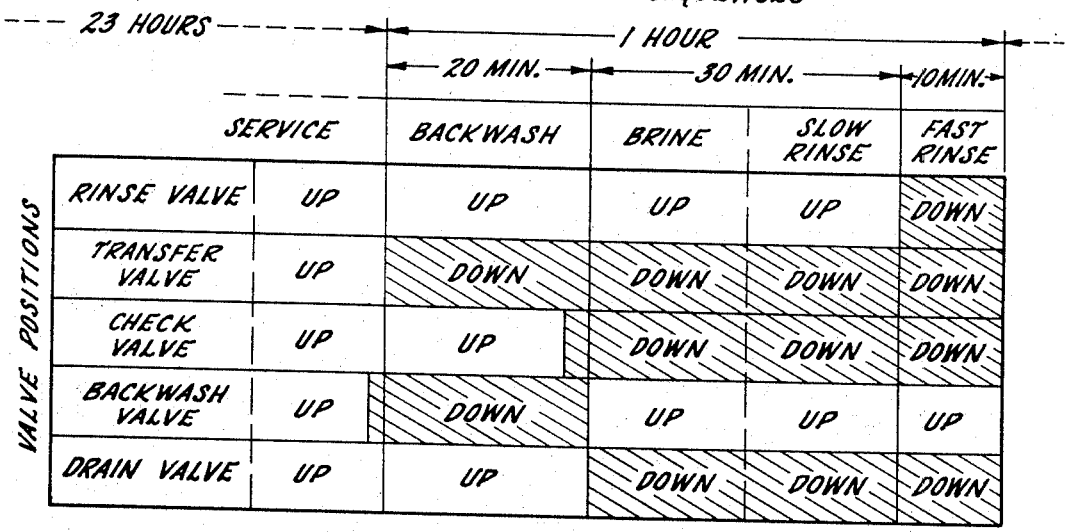
FIGURE 5 is a graph illustrating the time and operating sequences of the various valves in the valve arrangement.

Referring now to FIGURE 5, the operational sequence of the valves A–E is illustrated graphically. Here it will be seen that the valves A–E are referred to as being either "up" or "down." During the normal service operation of the water conditioning system, the valves are all in their up position. This normal service softening period ordinarily extends for twenty-three hours on any given day that regeneration is called for. When regeneration is called for by the time and day set assembly 43, the cams CA–CE manipulate the valve stems A1–E1 in the sequence illustrated in FIGURE 5 and cycle the various steps of backwash, brining, slow rinse, and fast rinse.

Figure 6:
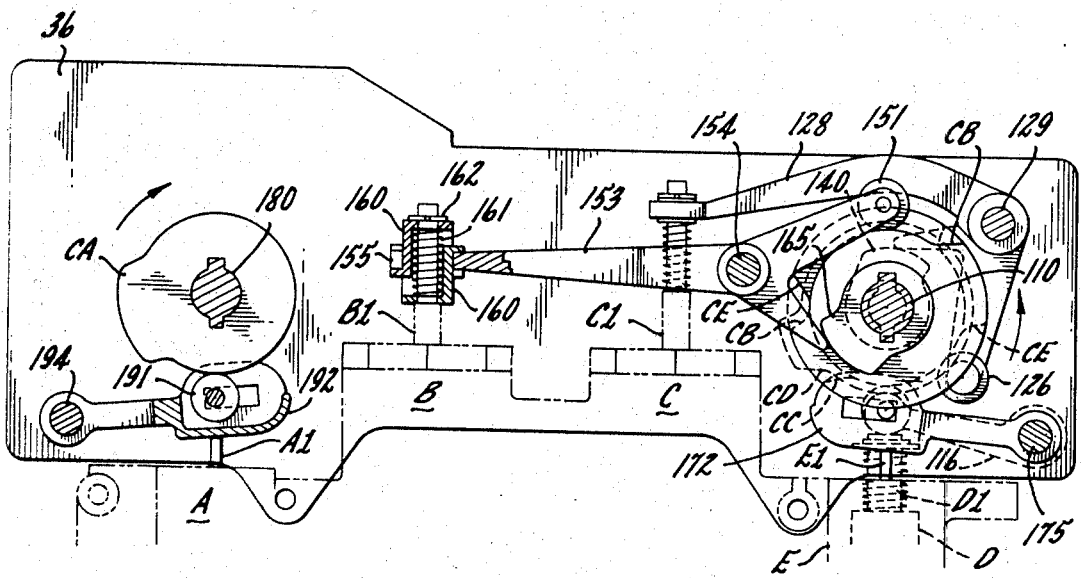
FIGURE 6 is a back view of the timing device, showing actuators for the valves A–E of the control valve arrangement in service softening position, with parts of the device shown in section.

Referring first to operation of the valves B–E, attention is directed to FIGURES 6–12. As seen in FIGURES 6 and 7, the transfer gear 104 is fixedly mounted in splined relationship on a rearward extension 109 of a cam shaft 110 journaled between the front and back chassis plates 35, 36, for rotation in suitably formed plastic bearings 111. Also splined on the extension 109 of the shaft 110 for rotation therewith is the backwash cam CD, best seen in FIGURE 8.

The backwash cam CD is arranged on the shaft 110 so that immediately after the transfer gear 104 begins to turn, as driven by the motor 40 through the clutch 50, it is effective on the valve pin D1 to drive the valve into its "down" position. This manipulation of the valve D is effected by the cam projection 115 formed on the periphery of the cam CD. The projection 115 extends over approximately 40 radial degrees of the cam CD, as will be recognized.

To force the valve pin D1 of the valve D downwardly, the cam projection engages a cam arm 117 (see FIGURES 1–3 and 8) mounted for pivotal movement on a fitting 117 secured to the chassis back plate 36. The fitting 117 is also secured to the valve arrangement 11.

The free end 118 of the cam arm 116 rests loosely on the head 119 of the valve pin D1 of the valve pin D1 and forces the pin downwardly when it, in turn, is engaged by the cam projection 115 in rotation of the cam CD. The pin D1 is normally biased into its "up" position by the coil spring 120 encirculing the pin D1 between a retaining washer 121 thereon, and the body of the valve arrangement 11.

Immediately the valve D is moved to its down position by the cam CD, the transfer valve B is also moved to its down position by the cam CB, thus initiating the backwash cycle of regeneration. As seen in FIGURE 10, the cam B has a cam projection 150 extending over approximately 220 radial degrees of its periphery. The cam projection 150 engages the cam roller 151 on the leg 152 extending from a cam arm 153, which is pivoted on a shaft 154 fixed between the front and back chassis plates 35, 36. The cam arm 153 is forced downwardly, thus forcing the valve pin B1 downwardly and moving the valve B to its down position.

As best seen in FIGURE 6, the free end 155 of the cam arm 153 is connected to the pin B1 by a loosely interlocked pair of identical fiittings 160 having a coil spring 161 therebetween. The free end 155 of the cam arm 153 is retained between the fittings 160, which are biased apart by the coil spring 161, and retained on the pin C1 by the lock washer 162. This connection permits resilient last motion movement of the cam arm 153 relative to the pin B1, so that the cam arm forces the valve B to seat resiliently in both its "up" and "down" positions.

The transfer valve B remains in its down position for the brining, slow rinse, and fast rinse cycles of regeneration. After the fast rinse cycle, a cam projection 165 formed coaxially and unitarily with the cam CG, engages the finger 166 extending from the cam arm 153 and forces it into its dotted line position, as seen in FIGURE 9. The valve pin B1 is forced upwardly, of course, moving the valve B to its "up" position.

Returning to the backwash cycle, immediately before its end, after slightly less than twenty minutes of the regeneration cycle has transpired, the cam CG moves the check valve C to its "down" position. FIGURES 7 and 9, the cam CC has a cam projection 125 formed on its periphery, extending over approximately 180 radial degrees of the cam. When the cam projection 125 engages a cam roller 126 on the leg 127 of the cam arm 128, the cam arm 128 pivots about its mounting shaft 129, journaled between the front and back chassis plates 35, 36, to force the valve pin B1 and, accordingly, the valve B, into its "down" position.

The free end 130 of the cam arm 128 has an aperture formed therein for receiving the pin C1, and bracketing lock washers 131 on the pin retain the pin in operative relationship on the arm. A light coiled spring 133 tends to hold the valve C in its "up" position, and accordingly, when the arm is not biased downwardly by the cam CC, it remains in its dotted line position, as seen in FIGURE 9.

The cam projection 125 on the cam CC maintains the valve C in its "down" position for the entire one hour of regeneration. After this one hour of regeneration, the cam roller 126 falls off of the cam projection 125 and a cam projection 140 formed co-axially with and immediately adjacent the cam CC is effective to engage the return arm 141 and force the cam arm 128 upwardly, moving the valve stem C1 upwardly and, accordingly, the valve C to its "up" position.

Referring back again, however, to the body of the regeneration process, immediately after the check valve C is moved to its "down" position, the backwash valve D is permitted to move to its "up" position by the cam CD. In other words, the cam projection 115 rotates past the end 118 on the cam arm 116, permitting the coil spring 120 to force the valve pin D1 upwardly. This terminates the backwash cycle of regeneration.

At the same time that the backwash valve D is returned to its "up" position, the drain valve E is moved to its "down" position by the cam CE. The cam CE, as seen in FIGURE 11, has a cam projection 170 extending over approximately 120 radial degrees of its periphery. At the end of the backwash period of twenty minutes, the cam projection 170 engages a roller 171 rotatably and slidably journaled in slots in the free end 172 of a cam arm 174 pivotally mounted on a shaft 175 extending between the front and back chassis plates 35, 36. The cam projection 170 forces the roller 171 downwardly, thus causing the free end 172 of the arm 174 to urge the pin E1 downwardly, moving the valve E to its down position. The drain valve E remains in this down position through the brining, slow rinse, and fast rinse cycles of regeneration, after which the cam projection 170 passes the roller 171, permitting the spring loaded pin E1 to drive the cam arm 174 upwardly, and move the valve E to its up position.

Brining and slow rinse take place during the thirty minutes immediately following the drain valve E moving to its down position, as hereinbefore described. No positive action of the valves A–E occurs during these two cycles. For a description of the actual mechanics of the brining and slow rinse, attention is directed to the aforementioned co-pending application.

After a thirty minute combined brining and slow rinse cycle has transpired, the fast rinse cycle is initiated by the cam CA moving the rinse valve A to its down position. Referring to FIGURES 7 and 12, the cam CA is fixedly mounted in splined relationship on the shaft 180. The shaft 180 is, in turn, journaled in a plastic bearing 181 seated in a suitable aperture in the back chassis plate 36. The front end 182 of the shaft 180 is rotatably mounted in and relative to a plastic sleeve shaft extending through the front chassis plate 35 and forming a component of the aforementioned clutch assembly 51, as well as the time and day set assembly 43.

The rear free end 186 of the shaft 180 has a transfer gear 103 splined thereon. Rotation of the transfer gear 103 through the gear train 49a from the motor 40, in the manner hereinbefore discussed, rotates the shaft 180 and, accordingly, the cam CA in a clockwise direction when viewed from the front chassis plate 35.

A cam projection 190 on the cam CA extends over approximately sixty radial degrees of its periphery. The cam projection 190 is positioned on the cam CA, relative to the projections on the cams CB–CE, for example, so that at the end of the combined brining and slow rinse cycles of generation, the projection 190 engages a roller 191 slidably and rotatably journaled in slots in the free end 192 of a cam actuator arm 193. The cam actuator arm 193 is, in turn, pivotally journaled on a shaft 194 mounted between the front and back chassis plates 35, 36. When the roller 191 is engaged by the cam projection 190, the arm 193 pivots about the shaft 194 to force the valve pin A1 downwardly and move the valve A to its down position. This initiates the fast rinse cycle.

The valve A is normally spring loaded toward its up position, so when the cam projection 190 has rotated past the roller 191, the spring moves the valve A into its up position once again. At this time, all of the valves A–E are in their up position, and service softening is re-initiated.

The manner in which the timing device 10 manipulates the valve arrangement 11 to cycle regeneration when it is called for by the time and day set assembly 43 should now be clearly understood. Turning to the details of construction of the time and day set assembly 43, and the manner in which it does call for and initiate, as well as stop, regeneration, attention is directed again to FIGURES 1–3, and also to FIGURES 13–19.

Referring particularly to FIGURE 3, the gear train 49b includes a pinion gear 200 formed on the sleeve shaft 73 immediately adjacent the disc gear 72. The pinion gear 200 meshes with a disc gear 201 mounted for rotation on the parallel shaft 68 extending between the front and back chassis plates 35, 36. The disc gear 201 is separately rotatable on the shaft 68 from the disc gear 67.

The disc gear 201 has a sleeve 202 formed unitarily with it and extending toward the front chassis plate 35. A pinion gear 203 is formed on the front end of the sleeve 202 and is in mesh with a disc gear 210 mounted for rotation on the aforedescribed sleeve shaft 183. The spring clutch assembly 51 normally connects the disc gear 210 with the sleeve shaft 183 and, accordingly, rotates the sleeve shaft with the disc gear in a clockwise direction. The disc gear 210, the sleeve shaft 183, and the clutch assembly 51, are supported for rotation by the shaft 180, but are entirely divorced from its rotation.

The spring clutch assembly 51 includes a flange 215 formed on the inner end of the sleeve shaft 183, immediately adjacent the cam CA, in rotatably slidable relationship therewith. Extending into immediately adjacent relation with the flange 215, so that their outer surfaces are co-extensive, is a hub 218 on the disc gear 210. A cylindrical coil spring 220 helically encircles the hub 218 and flange 215, as seen in FIGURE 7, in a clockwise direction as viewed from the front chassis plate 35.

A free end 221 of the coil spring 220 is bent radially inwardly thereof and retained in a suitably formed anchoring aperture in the hub 215 so that the coil spring cannot rotate relative to the spring. Accordingly, rotation of the disc gear 210 and its hub 218 within the confines of the coil spring 220 naturally tends to tighten the coil spring on the hub 218 and the flange 215 and rotate the sleeve shaft 183, as driven by the gear train 49b from the motor 40.

As will be recognized, the spring clutch assembly 51 hereinbefore described does permit the sleeve shaft 183 to be rotated in a clockwise direction relative to the disc gear 210 without the spring coil 220 binding the two together. This permits the time and day set assembly 43 to be adjusted relative to the gear train 49b and, accordingly, the motor 40. As hereinafter discussed, this facilitates setting the time and day set assembly 43 with sun time.

As seen in FIGURES 1 and 13, the sleeve shaft 183 extends through the front chassis plate 35 in bearing relationship, and also extends through a suitably formed aperture 225 in the face plate 32 of the housing. The sleeve shaft 183 is flattened along one side 229 so that a cam 230 having a correspondingly formed aperture 231 can be slipped over the shaft 183 for sliding rotation against the front chassis plate 35 on a bearing ridge 232. A peripheral cam surface is formed on the cam 230, extending from a low point 234 through 360 degrees to a high point 235, forming a drop off 236 therebetween. The cam 230 is resiliently biased against the plate 35 by a coil spring 238 encircling the sleeve shaft 183 and extending between the cam and the time set knob 239 of the time set subassembly 240.

Referring now to FIGURES 14–17, a cam follower arm 245 slidably mounted on the front chassis plate 35 under an inverted L-shaped fitting 246 is spring biased toward the cam surface 233 by a coil spring 247 extending between the fitting 246 and a depending extension 248 of the cam follower arm 245. A follower 250 on the corresponding free end of the arm 245 rides on the peripheral cam surface 233. The arm 245 is limited in its travel transversely of the fitting 246 by a pin 251 in the fitting extending through a slot 252 formed in the arm 245.

The cam 230 is rotated in a clockwise direction at a constant speed of one revolution every twelve hours. As the cam rotates, it forces the cam follower arm 246 to the right against the bias of the coil spring 247. The cam 230 continues to bias the follower arm 245 to the right until the high point 235 of the cam surface 233 is reached, whereupon the follower arm is drawn forcefully to the left in its fitting 246 by the spring 247 as the cam follower surface 250 falls off the drop off 236. In moving to the left in this fashion, the cam follower arm 245 turns the day set sub-assembly 255 to the next twelve hour period setting.

At the same time, depending upon the setting of the day set sub-assembly 255, the time and day set assembly 43 is effective either to release the cam 93 of the clutch assembly 50 so that regeneration can take place at that time on the day in question, or to continue to immobilize the cam 93 and prevent regeneration at that time.

Figure 15:
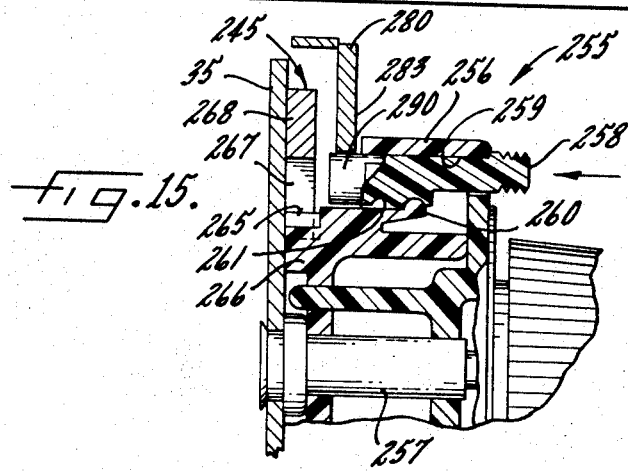
FIGURE 15 is an enlarged sectional view through the day set sub-assembly illustrating it in its "non-actuation" relationship.

The day set sub-assembly 255 includes an annular plastic ring 256 mounted for rotation on a shaft 257 fixed to the front chassis plate 35. The ring 256 has fourteen day pins 258 mounted in its periphery in suitably formed passages 259 evenly spaced around the ring and extending transversely through it. The pins 258 are movable in the passages 259 between a "pushed in" position, as illustrated in FIGURE 15, and a "pulled out" position, as illustrated in FIGURE 17. Resilient plastic fingers 260 in the apertures 259 seat in complementary recesses 261 in the pins 258 to resiliently retain the pins 258 in whichever of their two positions they are preset, either pushed in, or pulled out.

Each pin 258 represents a twelve hour period, or one-half of a day, in each day of seven day week. When a pin 258 for a specific twelve hour period is in its pushed in position, the time and day set assembly 43 immobilizes the cam 93 of the clutch 50 and the timing device 10 is ineffective to automatically initiate and cycle regeneration of the water conditioning system during that particular twelve hour period. Conversely, if one or more of the pins 258 is in its pulled out position, the time and day set assembly is effective to release the cam 93 and initiate regeneration at the preset time during the twelve hour period in question.

The day set ring 256 has fourteen rachet teeth 265 formed around the periphery of a reduced diameter section 266, extending rearwardly of the ring rotatably seated against the front chassis plate 35. The cam follower arm 245 has a depending rachet tongue 267 formed adjacent the free end 268 of the arm opposite the cam follower 250 thereon. The depending tongue 267 is adapted to engage each rachet tooth in sequence and rotate the ring 256 through one-fourteenth of 360 degrees or approximately 25.5 degrees, each time the cam follower 250 reaches and falls off the cam drop-off 236 whereby the arm 245 is driven to the left by the coil spring 247.

The cam follower arm 245 is mounted loosely for transverse movement under the fitting 246 and, accordingly, it can pivot on the front chassis plate 35 about an axis defined by the pin 251. The coil spring 247, by virtue of its slightly downwardly inclined relationship to the follower arm 245, tends to draw the tongue 267 of the arm down into engagement with the rachet teeth 265 of the ring 256.

As the cam follower arm 245 is forced to the right by the cam 230, the inclined leading edge 270 on the tongue 267 rides up on the inclined back surface 271 of the corresponding rachet tooth 265, causing the cam follower arm 245 to pivot upwardly about the pin 251 against the bias of the coil spring 247, until the tongue falls off the end of the corresponding rachet tooth immediately prior to the cam follower surface 250 reaching the high point 235 of the cam surface 233 and falling off the drop off 236. Consequently, when the high point 235 of the cam surface 233 does rotate past the cam follower 250, the coil spring 247 draws the cam follower arm 245 to the left and rotates the day set ring 256 through the aforementioned 25.5 degrees.

To assure that the ring 256 only rotates in a counterclockwise direction, and counteract the influence of the cam follower arm 245 tending to rotate it in a clockwise direction as the cam 230 forces the arm towards the right, a spring loaded stop bar 275 is biased against the ring 256. The stop bar 275 is pivotally mounted in the lower end of the fitting 246, as at 276, and is spring loaded upwardly toward the day set ring 256 by a coil spring 277 extending between the free end 278 of the bar 275 and another L-shaped fitting 280 secured to the face of the front chassis plate 35. Note that this fitting 280 also guides the free end 268 of the cam follower 245 in its travel transversely of the ring 256 on the front chassis plate 35. The spring 277 biases the bar 275 upwardly so that a locking tooth 281 formed intermediate the bar's extremities engages each rachet tooth 265 on the ring as the ring rotates and permits rotation of the ring only in a counterclockwise direction.

Figure 14A:
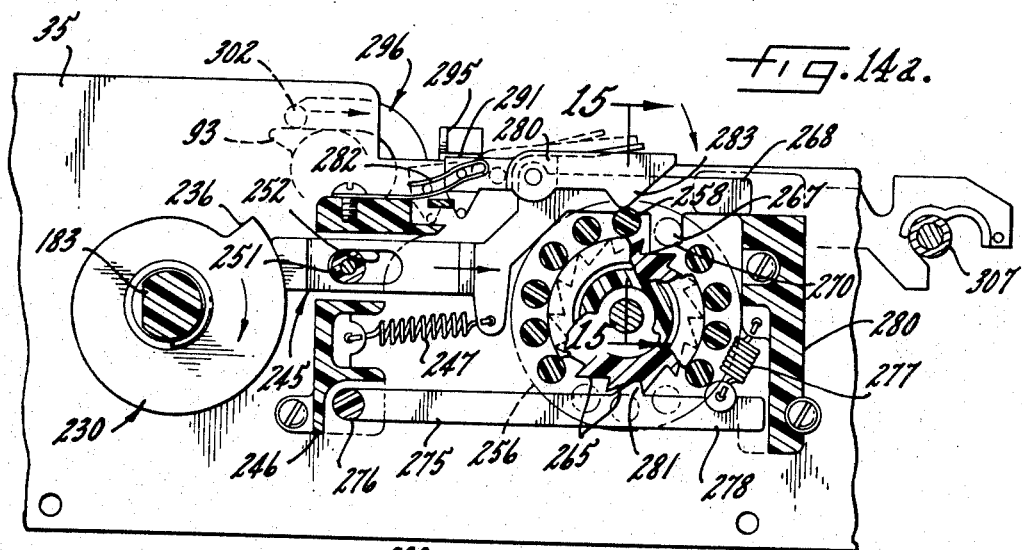
FIGURE 14a is a view similar to FIGURE 14 showing parts in section, and illustrating a later moment in time when the time and day set assembly is about to pass a regeneration time on a given day without signalling the regeneration.

As the cam follower arm 245 is biased toward the right by the rotating cam 230 and the tongue 267 falls in behind the appropriate rachet tooth 265, a sensing arm 280, pivotally mounted at 281 on the cam follower arm 245, is pivoted downwardly by the upwardly curved guide spring 282 so that its nose 283 "looks for" the protruding rear end 290 of a particular day pin 258. If the day pin is in its pushed-in position, as seen in FIGURE 15, the nose 283 engages it and the sensor arm 280 can pivot no further about its pivot pin 281. As a result, when the follower arm 245 is moved rapidly to the left by the coil spring 247, the contact heel 291 of the sensor arm 280 passes underneath the trip finger 295 on an immobilizer arm 296, as seen in FIGURE 14a. Accordingly, the immobilizer arm 296 does not move out from restraining engagement with the cam 93, and regeneration does not occur at that particular time. In other words, the time and day set assembly 43 is signalling that regeneration is not called for at 2:00 a.m., for example, during the twelve hour period in question, and service softening goes on as usual.

If the nose 283 on the sensor arm 280 does not engage the rear end 290 of a day pin 258, as when the day pin in question is in its pulled out position, the guide spring 282 forces the heel 291 of the sensor arm 280 upwardly to the position illustrated in FIGURES 16 and 16a. When the follower arm 245 is moved rapidly to the left by the coil spring 247 as the cam follower 250 falls off the drop off 256, the heel 291 engages the trip finger 295 and drives the immobilizer arm 296 to the left, freeing the cam 93 and the clutch 51 for rotation. Accordingly, in the manner hereinbefore discussed, regeneration is initiated.

Referring to FIGURES 18–19, the immobilizer arm 296 comprises an elongated body 300 having a U-shaped mouth 301 formed at one end. The U-shaped mouth 301 receives and is slidable on the bearing 78 for the pin-shaft 74, as illustrated in FIGURE 4. A transversely extending immobilizer pin 302 mounted on the upper leg 303 of the U-shaped mouth 301 normally overlies and is slidable on the immobilizer cam 93.

The opposite end 306 of the immobilizer arm body 300 is loosely supported by a stub pin 307 fixed to the inner surface of the front chassis plate 35. A segmentally cylindrical position seat 310 in the body end 306 seats on the pin 307 when the immobilizer arm is in its retracted, cam 93 immobilizing position, as illustrated in FIGURES 18, while an identical segmentally cylindrical seat 311 immediately adjacent the seat 310 supports the arm 296 when it is in its advance or non-immobilizing position, as illustrated in FIGURE 18a.

The aforedescribed trip finger 295 extends transversely from a trip arm 320 pivotally mounted on the immobilizer arm 296. A coil spring mounted in a slot 323 in the immobilizer arm body 300 interconnects the trip finger 320 with the immobilizer arm 300 to cushion the shock of the heel 291 on the sensor arm 280 when it strikes the trip finger and drives the immobilizer arm from its immobilizing position as seen in FIGURE 18, to its non-immobilizing position, as seen in FIGURE 18a.

After regeneration has been completed and, in fact, a total period of two hours has passed while the cam shaft 110 makes one complete revolution, a return cam 330 on the shaft 110 engages a cam surface 331 on a return arm 332 pivotally mounted on a stub shaft 335. The stub shaft 335, for reasons hereinafter discussed, is also pivotally mounted in a plastic bearing 336 seated in a suitable aperture in the front chassis plate 335.

When the cam 330 strikes the surface 331 of its rotation, it pivots the arm 332 in a clockwise direction about its mounting shaft 335, and a return pin 340 loosely seated in a slot 341 in the immobilizer arm body 300 forces the immobilizer arm 296 to return to its retracted position (as seen in FIGURE 18). The immobilizer cam 93 is thus immobilized, preventing transmission of torque through the clutch assembly 51 to the shaft 110 and, accordingly, the shaft 110 ceases rotating. The timing device 10 is now set for the next regeneration called for by the time and day set assembly 43.

If it becomes desirable to manually initiate regeneration at any time on any given day or days of the week, a guest knob 350 can be rotated to initiate regeneration. The guest knob 350 is fixed to the shaft 335 by a threaded bolt 352. A cross-arm 355 is fixed to the inner end of the shaft 335, and has an actuator pin 356 mounted on one free end. By turning the actuator knob 351 in a counterclockwise direction, the cross member 355 is rotated correspondingly, forcing the pin 356 against the abutment surface 357 on the immobilizer arm 296, and driving the immobilizer arm into the position illustrated in FIGURE 18a, whereupon regeneration is initiated.

The cross member 355 is normally biased away from the abutment surface 357 by a coil spring 360 extending between it and a suitable attachment with a chassis plate 35. To restrain the cross member 355, a restrainer leg 361 seats loosely against the shaft 110.

Turning now to the time set sub-assembly 240, it will be recalled that the timing device 10 has been described in terms of calling for regeneration at 2:00 a.m. or 2:00 p.m. These times are preset in the factory, but it is necessary to set the time set sub-assembly in phase with "sun time." To do this, the sleeve shaft 183 is rotated through the knob 239 until a mark 361 on a disc 352 rotatable with the sleeve shaft is aligned with the correct time of day or night, as pictured on the clockface 365. The mark 361 is, of course, aligned with the drop off surface 236 on the cam 230.

We claim:
1. A timing device for controlling the operation of responsive means according to a schedule, comprising: motor means turning an output shaft at a constant speed, means connecting said output shaft to operator means, said connecting means including drive shaft means, driven shaft means, and coil spring clutch means effectively interconnecting said shaft means to cause them to rotate together when said clutch means is released at a predetermined time, said clutch means normally being ineffective to connect said first and second shafts for rotation together and timing means driven by said output shaft, said timing means containing cam means which actuates trip means at a predetermined time during a given period to release said clutch means and render said operator means operative, and stop means which render said trip means inoperative to release said clutch means when said trip means is actuated by said cam means outside of said given time period.

2. A timing device for controlling the operation of responsive means according to a predetermined schedule, comprising: motor means turning an output shaft at a constant speed, first drive train means connecting said output shaft to operator means, second drive train means connecting said output shaft to timing means, said first drive train means including clutch means normally rendering said operator means inoperative, said timing means being effective at a preselected time to release said clutch means and render said operator means operative.

3. The timing device of claim 2 further characterized in that said second drive train means includes clutch means for permitting the presetting of said preselected time in said timing means without positive disconnection from said motor means.

4. The timing device of claim 2 further characterized in that said clutch means comprises a helical coil spring clutch.

5. The timing device of claim 3 further characterized in that said second drive train clutch means comprises a one-way helical coil spring clutch.

6. In a water conditioning system including a valve arrangement having a plurality of valves for controlling service water flow and regeneration, a timing device for operating the valves according to a predetermined schedule to sequence normal service softening and regeneration, comprising: a chassis, cam means mounted in said chassis for operating said valves, motor means turning an output shaft at a constant speed, a gear train in said chassis connecting said output shaft to said cam means to rotate said cam means and operate said valves, said gear train including clutch means, and time and day set means driven by said output shaft, said time and day set means including clutch actuator means, said clutch actuator means being effective on said clutch means to render said gear train inoperative to rotate said cam means until said time and day set means causes said clutch actuator means to release said clutch means and render said gear train operative to rotate said cam means at a predetermined time or times on any given day or days.

7. The timing device of claim 6 further characterized by and including another gear train means connecting said output shaft to said time and day set means, and one way clutch means in said other gear train for permitting adjustment of said time and day set means relative to said output shaft without positive disconnection from said output shaft.

8. The timing device of claim 7 further characterized in that said clutch means includes a drive member and a driven member, and a helical spring encircling both the drive member and the driven member in a direction contrary to the direction of rotation of said drive member, said helical spring having catch means thereon, said clutch actuator means engaging said catch means to loosen said spring and prevent rotation of said driven shaft by said drive shaft during normal service operation of said water conditioning system, said time and day set means causing said clutch actuation to release said catch means when the preset regeneration time is reached.

9. The timing device of claim 8 further characterized in that said time and day set means includes a cam rotated by said second gear train through said one way clutch means so as to make one revolution in each period, said cam having a single step cam formed circumferentially thereon, said step being radially arranged in phase with sun time, a spring loaded cam follower biased against said cam surface, said cam follower arranged to fall off said step at correct sun time for regeneration and rotate a day set dial, and means on said day set dial for rendering said clutch actuator means either operative to release said spring clutch, or inoperative to do so, depending upon whether regeneration has been preset for that particular time period.

10. The timing device of claim 9 further characterized in that said clutch actuator means includes an immobilizer arm slidable transversely of said shafts, said cam follower carrying means for engaging and sliding said arm out of engagement with said catch means when the day set immobilizer dial permits regeneration at the time preset.

11. The timing device of claim 10 further characterized by and including return cam means on one of said shafts for returning said immobilizer arm to engagement with said catch means when regeneration is completed.

12. In a water conditioning system including a valve arrangement having a plurality of valves for controlling service water flow and regeneration, a timing device for operating the valves according to a predetermined schedule to sequence normal service softening and regeneration, comprising: a chassis, means mounted in said chassis for operating said valves, motor means turning an output shaft at a constant speed, drive means on said chassis connecting said output shaft with said valve operator means to manipulate said valves, clutch means in said drive means for rendering said drive means ineffective to manipulate said valves when it is restrained, time indicating means driven by said shaft, and clutch actuator means responsive to said time indicating means for releasing said clutch means from restraint and rendering said drive means effective to manipulate said valves and cycle regeneration at a predetermined time.

13. The timing device of claim 12 further characterized in that said time indicating means includes a timing cam driven by said shaft, a cam follower biased against said cam, and day set means turned by said cam follower in response to rotation of said cam, said cam follower having actuator finger means mounted thereon and effective to release said clutch means from restraint when said day set means permits it to.

14. The timing device of claim 13 further characterized in that said actuator finger means is pivotally mounted on said cam follower, and spring means biasing said actuator finger into engagement with said day set means whereby said finger senses the time period in which said timing device calls for regeneration, said finger then pivoting on said cam follower into a position where it causes restrainer means to release said clutch means at a predetermined time determined by the rotation of said cam.

15. The timing device of claim 14 further characterized in that said valve operator means includes return means for returning said restrainer means to a position where it restrains said clutch means once again and stops regeneration after a predetermined time period.

References Cited

UNITED STATES PATENTS

| | | | |
|---|---|---|---|
| 2,683,514 | 7/1954 | Hardway | 192—41 |
| 3,028,964 | 4/1962 | Reynolds | 210—140 |
| 3,080,974 | 3/1963 | Rose. | |
| 3,092,738 | 6/1963 | Lamkin | 210—140 |
| 3,278,424 | 10/1966 | Griswold | 210—140 |
| 1,892,441 | 12/1932 | Wales et al. | 68—12 |

FRED C. MATTERN, JR., *Primary Examiner.*

WESLEY RATLIFF, *Assistant Examiner.*

U.S. Cl. X.R.

210—140; 68—12